United States Patent
Matei et al.

(10) Patent No.: US 11,137,318 B2
(45) Date of Patent: Oct. 5, 2021

(54) MODEL-BASED DIAGNOSIS IN FREQUENCY DOMAIN

(71) Applicant: Palo Alto Research Center Incorporated, Palo Alto, CA (US)

(72) Inventors: Ion Matei, Sunnyvale, CA (US); Aleksandar B. Feldman, Santa Cruz, CA (US); Johan de Kleer, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 547 days.

(21) Appl. No.: 16/030,727

(22) Filed: Jul. 9, 2018

(65) Prior Publication Data

US 2019/0383700 A1 Dec. 19, 2019

Related U.S. Application Data

(60) Provisional application No. 62/687,098, filed on Jun. 19, 2018.

(51) Int. Cl.
*G01M 13/00* (2019.01)
*G05B 23/02* (2006.01)

(52) U.S. Cl.
CPC ......... *G01M 13/00* (2013.01); *G05B 23/0254* (2013.01)

(58) Field of Classification Search
CPC .................................................. G01M 13/00
See application file for complete search history.

(56) References Cited

U.S. PATENT DOCUMENTS

| | | | | |
|---|---|---|---|---|
| 5,576,632 A | * | 11/1996 | Petsche | G01R 31/343 324/765.01 |
| 2008/0052067 A1 | * | 2/2008 | Morito | G10L 21/0208 704/226 |

* cited by examiner

*Primary Examiner* — Kyle R Quigley
(74) *Attorney, Agent, or Firm* — Shun Yao; Park, Vaughan, Fleming & Dowler LLP.

(57) ABSTRACT

One embodiment can provide a method and a system for diagnosing faults in a physical system. During operation, the system obtains a time-domain model of the physical system and converts the time-domain model to the frequency domain to obtain a frequency-domain model of the physical system. The time-domain model can include one or more model parameters having known values. The system also obtains time-domain input and output signals and converts the time-domain input and output signals to the frequency domain to obtain frequency-domain input and output signals. The system identifies at least one model parameter having an expected value that is different from a known value of the at least one model parameter based on the frequency-domain model and the frequency-domain input and output signals, and generates a diagnostic output indicating at least one component within the physical system being faulty based on the identified at least one model parameter.

17 Claims, 17 Drawing Sheets

Algorithm 1 Particle filter in frequency domain

1: $[\{p_n^i, \alpha_n^i\}] = \text{PF}\left[\{p_{n-1}^i, \alpha_{n-1}^i, Y_n\}\right]$
2: for $i = 1 : N_s$ do
3:    Draw $p_n^i \sim \text{pr}(p_n|p_{n-1}^i)$
4:    Update particle weight $\alpha_n^i = \alpha_{n-1}^i \text{pr}(Y_n^{re}|p_n^i)\text{pr}(Y_n^{im}|p_n^i)$
5: Calculate total weight $t = \sum_{i=1}^N \alpha_n^i$
6: for $i = 1 : N_s$ do
7:    Normalize particle $\alpha_n^i = \alpha_n^i t^{-1}$
8: Compute degeneracy metric
9: if Degeneracy metric reaches a threshold then
10:    Resample particles

FIG. 6

TABLE I

Single fault case - parameter estimates

|         | $\hat{R}$ | $\hat{L}$ | $\hat{k}$ | $\hat{J}$ | $\hat{d}$ |
|---------|-----------|-----------|-----------|-----------|-----------|
| $R = 1.5$ | 1.500 | 0.612 | 0.0066 | 0.002 | 0.1495 |
| $L = 0.75$ | 1.0022 | 0.7500 | 0.0099 | 0.0310 | 0.1006 |
| $k = 0.03$ | 0.3414 | 0.2763 | 0.0300 | 0.0057 | 0.03360 |
| $J = 0.03$ | 0.9981 | 0.7164 | 0.0099 | 0.0300 | 0.1002 |
| $d = 0.3$ | 3.0204 | 370.863 | 0.00333 | 397.1050 | 0.3000 |

TABLE II

Single fault case - cost value estimates

|         | $J(\hat{R})$ | $J(\hat{L})$ | $J(\hat{k})$ | $J(\hat{J})$ | $J(\hat{d})$ |
|---------|--------------|--------------|--------------|--------------|--------------|
| $R = 1.5$ | 2.106e-06 | 10.593 | 0.074 | 10.575 | 0.0466 |
| $L = 0.75$ | 0.2574 | 1.425e-06 | 0.2517 | 0.0338 | 0.25343 |
| $k = 0.03$ | 22.711 | 375.27 | 1e-04 | 376.48 | 2.2425 |
| $J = 0.03$ | 0.2500 | 0.0306 | 0.2489 | 1.6744e-06 | 0.2497 |
| $d = 0.3$ | 0.0564 | 10.693 | 0.0042 | 10.7311 | 7.7639e-07 |

FIG. 10

TABLE III

|  | $\hat{R}$ | $\hat{L}$ | $\hat{k}$ | $\hat{J}$ | $\hat{d}$ |
|---|---|---|---|---|---|
| $J(\boldsymbol{p})$ | 4.291e-3 | 4.844e-3 | 3e-5 | 1.8e-5 | 6.44e-4 |
| $\sigma_{w_n}$ | 0.01 | 0.005 | 1e-4 | 0.001 | 0.005 |

PARTICLE FILTER COST FOR ESTIMATING SINGLE PARAMETERS

|        | $I_L$ | $V_L$ | $V_e$ | $T_e$ | $T_J$ | $T_d$ | $V_R$ | $U$ | $\dot{\Theta}$ | $i_{L0}$ | $\dot{\Theta}_0$ |
|--------|-------|-------|-------|-------|-------|-------|-------|-----|----------------|----------|------------------|
| $eq_1$ | ①     |       |       |       |       |       | 1     |     |                |          |                  |
| $eq_2$ | 1     | ②     |       |       |       |       |       |     |                | 1        |                  |
| $eq_3$ |       | 1     | 1     |       |       |       | 1     | 1   |                |          |                  |
| $eq_4$ |       |       | ①     |       |       |       |       |     | 1              |          |                  |
| $eq_5$ | 1     |       |       | ②     |       |       |       |     |                |          |                  |
| $eq_6$ |       |       |       |       | ①     |       |       |     | -1             |          | 1                |
| $eq_7$ |       |       |       |       |       | ①     |       |     | -1             |          |                  |
| $eq_8$ |       |       |       | 1     | 1     | 1     |       |     |                |          |                  |

FIG. 14A

|        | $R$ | $L$ | $k$ | $J$ | $d$ |
|--------|-----|-----|-----|-----|-----|
| $eq_3$ | 1   | 1   | 1   | 0   | 0   |
| $eq_8$ | 1   | 0   | 1   | 1   | 1   |

FIG. 14B

MODEL-BASED DIAGNOSIS IN FREQUENCY DOMAIN

RELATED APPLICATION

This claims the benefit of U.S. Provisional Patent Application No. 62/687,098, entitled "MODEL BASED DIAGNOSIS IN FREQUENCY DOMAIN," filed Jun. 19, 2018, the disclosure of which is incorporated herein by reference in its entirety for all purposes.

BACKGROUND

Field

This disclosure is generally related to fault diagnosis of machinery. More specifically, this disclosure is related to a system and method for applying model-based diagnosis techniques in the frequency domain.

Related Art

Detection and diagnosis of mechanical faults in machinery can be very important in many industries. For example, rotating machinery have found applications in a wide variety of industries, such as aircraft, automobile, farm equipment, industrial compressors, etc. Such machinery is often bulky and expensive, thus making it impractical to use redundant systems. Therefore, in-service, real-time monitoring and fault detection is needed.

There are two types of approaches for fault diagnosis in machinery, including model-based diagnostic techniques and data-driven diagnostic techniques. In model-based approaches, a model of the machinery being diagnosed (i.e., the system) can be provided to the diagnosis engine. Such a model can describe the behavior of the components based on their physical properties. Moreover, the diagnosis engine can receive values of the parameters of the model and some of the input and output values. The goal of the model-based diagnosis is to determine, from only the system model and available input/output values, whether a fault is present, and if so, the cause of the fault. This process can require a great amount of computation resources. On the other hand, data-driven approaches use statistical models (e.g., classifiers or regressors) trained with labeled data that describe the behavior of the system under different fault modes. This data-driven approach requires a large amount of data in order to build meaningful statistical models, and such a condition may not be easily satisfied. Moreover, the data-driven approaches often cannot provide sufficient information for explaining the detected system fault.

SUMMARY

One embodiment can provide a method and a system for diagnosing faults in a physical system. During operation, the system obtains a time-domain model of the physical system and converts the time-domain model to the frequency domain to obtain a frequency-domain model of the physical system. The time-domain model can include one or more model parameters having known values. The system also obtains time-domain input and output signals and converts the time-domain input and output signals to the frequency domain to obtain frequency-domain input and output signals. The system identifies at least one model parameter having an expected value that is different from a known value of the at least one model parameter based on the frequency-domain model and the frequency-domain input and output signals, and generates a diagnostic output indicating at least one component within the physical system being faulty based on the identified at least one model parameter.

In a variation on this embodiment, the time-domain model comprises at least one non-linear component.

In a further variation, converting the time-domain model to the frequency domain includes applying a Fourier transform on linear components of the time-domain model to obtain a frequency-domain expression of the linear components, applying a machine-learning technique to obtain a frequency-domain expression of the at least one non-linear component, and combining the frequency-domain expressions of the linear and non-linear components of the time-domain model to obtain the frequency-domain model.

In a variation on this embodiment, identifying the at least one model parameter comprises one of: applying an optimization algorithm, applying a particle filter formulated in the frequency domain, and generating a fault signature matrix using analytical redundancy relations derived from the frequency-domain model.

In a variation on this embodiment, identifying the at least one model parameter comprises selecting a set of frequencies and performing computation in parallel for each frequency within the selected set of frequencies. Output signals of the frequency-domain model at a respective frequency depend only on input signals at the respective frequency.

In a further variation, selecting the set of frequencies comprises, in response to magnitude of the frequency domain input or output signals at a particular frequency exceeding a predetermined threshold value, adding the particular frequency to the selected set of frequencies.

In a variation on this embodiment, identifying at least one model parameter comprises determining whether a difference between the expected value and the known value of the at least one model parameter is greater than a predetermined threshold.

BRIEF DESCRIPTION OF THE FIGURES

FIG. 6 shows a particle filter algorithm applied in the frequency domain, according to one embodiment.

FIG. 10 displays two tables showing the optimization results, according to one embodiment.

FIG. 14A shows steps in the casual assignment propagation, according to one embodiment.

FIG. 14B shows the constructed fault signature matrix (FSM), according to one embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of performing real-time in-service fault diagnosis of a complex system, which can include mechanical and electrical components. During operation, the fault-diagnosis system can apply one or more model-based diagnostic techniques directly in the frequency domain. More specifically, the fault-diagnosis system can receive a known model of the system in the time domain and converts the time-domain model to a frequency-domain model. The fault-diagnosis system can also obtain, from a number of sensors associated with the system-under-test (SUT), sensor output values, and converts the time-domain sensor output values to values in the frequency domain. Similarly, corresponding input values (e.g., operating parameters of the SUT) can also be converted to values in the frequency domain. Based on the input and output values and the model of the SUT in the frequency domain, the fault-diagnosis system can reach a diagnosis solution. This frequency-domain approach enables parallelization of the diagnosis algorithms, because in the frequency domain, the model's algebraic equations can be evaluated independently.

Establishing Frequency-Domain Models

Figure 1:
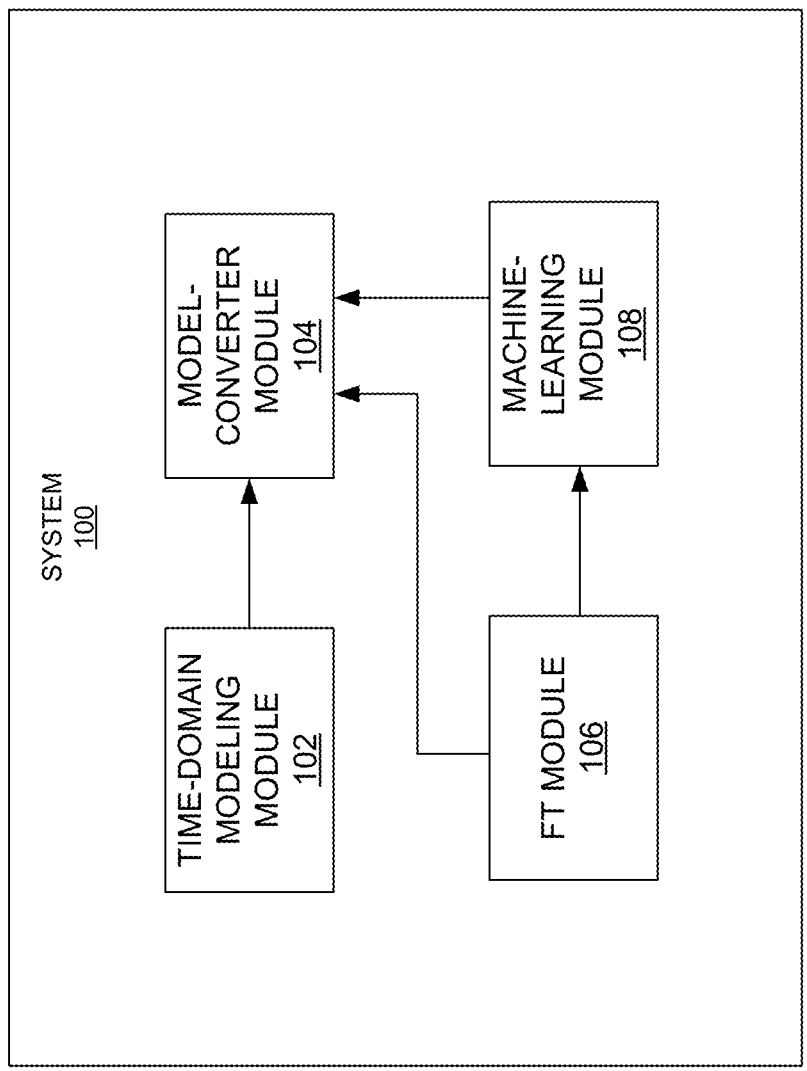
FIG. 1 shows an exemplary system for establishing frequency-domain models of a system-under-test, according to one embodiment.

In some embodiments, a time-domain model of the system-under-test (SUT) can first be projected into the frequency domain. FIG. 1 shows an exemplary system for establishing frequency-domain models of a system-under-test, according to one embodiment. System 100 can include a time-domain modeling module 102 for establishing time-domain models of the SUT, a time-domain-to-frequency-domain model-converter module 104 for performing domain conversion of the models, a Fourier transform (FT) module 106, and a machine-learning module 108.

In some embodiments, the time-domain model of the system can be derived based on the physical properties of components in the system and is often expressed as a set of equations, including both linear and non-linear equations. If the SUT is a linear system, a time-domain-to-frequency-domain model-converter 104 can convert a time-domain model to a frequency-domain model analytically due to the linearity property of the Fourier transform (FT) operator. More specifically, FT module 106 can be used to perform the corresponding FT for the model conversion. Note that many mechanical or electrical system components have relatively simple behavioral models, making it relatively easy to convert these time-domain models to the frequency domain.

If the SUT includes non-linear components, one cannot directly project the time-domain model to the frequency domain. However, the frequency representation of the non-linear components can be learned. More specifically, machine-learning module 108 can be used to learn the non-linear behavior of those non-linear components in the frequency domain. Learning the frequency representation of only the non-linear components can be more efficient than learning the frequency representation of the entire system, given that the number of non-linear components is much smaller than the number of linear components in the system.

The process of learning the frequency representation of the non-linear components can start with using an existing time-domain model of those components to generate training data. A time horizon T can be chosen, which will determine the minimum frequency the time series covers $$\left(f_{min} = \frac{1}{2T}\right).$$

In addition, a sampling period h will be chosen, which determines the maximum frequency the time series can include $$\left(f_{max} = \frac{1}{2h}\right).$$

One needs to choose h carefully to avoid the aliasing effect. The total number of sample points will be $$N = \frac{T}{h}.$$

The time series of the M inputs can also be generated, denoted as $\{(u_0^1, \ldots u_{N-1}^1)\}_{i=1}^{M}$. These input time series should be designed in such a way that they can excite the non-linear component across a large number of frequencies and amplitudes. A possible choice for such input time series would be the pseudo-random (binary) signal (PRBS). In addition, a set of M initial conditions $\{x_0^i\}_{i=1}^{M}$ can also be chosen. Based on the time-domain model, one can use the input time series and the initial conditions to simulate the behavior of the non-linear components in the time domain and record the output time series $\{(y_0^1, \ldots y_{N-1}^i)\}_{i=1}^{M}$. FT module 106 can compute the continuous Fourier transform (CFT) of both the input and output time series, which shows how the components respond at different frequencies and initial conditions. Namely, the frequency representations of the inputs, $\{(U_0^i, \ldots U_{N-1}^i)\}_{i=1}^{M}$, and outputs, $\{(Y_0^i, \ldots Y_{N-1}^i)\}_{i=1}^{M}$, can be obtained. The total number of training examples is N×M, where one example is the tuple $(Y_n^i, (U_n^i,$ $x_0^i$). Based on the training data, machine-learning module 108 can implement a model, which maps the input, output, and initial conditions, and a learning algorithm. In some embodiments, machine-learning module 108 can implement models based on neural networks, due to their flexibility in modeling non-linear relationships. Such models are trained using the back propagation algorithm with its variants (e.g., RMSprop, Adams, etc.). The resulting model is added to the rest of the frequency domain models of the linear components, achieving a model capable of describing the frequency behavior of the entire SUT.

To be used with the frequency-domain model, measured signals (e.g., input and output signals) need to be converted to the frequency domain by applying the FT operator. In some embodiments, FT module 106 can also be used to convert the measured input and output signals from the time domain to the frequency domain.

Like in the time domain, the system model in the frequency domain can include a set of algebraic equations. More specifically, these algebraic equations need to be satisfied for all frequencies. However, since the frequency band is limited by the sampling period of the input/output signals and the length of the time window for which the FT is computed, only a finite number of frequencies need to be considered.

Performing fault diagnosis in the frequency domain can provide a number of advantages. For example, for certain SUTs (e.g., rotating machinery), certain fault signatures (e.g., vibrations) can be better emphasized in the frequency domain. Moreover, in the frequency domain, the diagnosis algorithms can be parallelized since the model's algebraic equations can be evaluated independently for different frequencies. The parallelization of the diagnosis algorithms can significantly reduce the time for reaching a diagnosis solution.

In one example, the SUT's behavior can be described by the following dynamic equations in the time domain:

$$\dot{x} = A_{11}(p)x + A_{12}(p)z + B_1(p)u, \; x(0) = x_0, \quad (1)$$

$$0 = A(p)x + A_{22}(p)z + B_2(p)u, \quad (2)$$

$$y = C_1(p)x + C_2(p)z, \quad (3)$$

where x is the state vector, z is the vector of algebraic variables, u is the vector of inputs, y is the vector of outputs, and p is the vector of system parameters. Note that the time-domain model of a system may have different forms, depending on the physical properties of its components and relationships among the components within the system.

One can assume that there exists a non-empty set $\mathcal{P}$, so that if $p \in \mathcal{P}$ Equations (1)-(2) have a unique solution over some time interval [0, T]. If $A_{22}$ is invertible, one can eliminate algebraic variables $z = -A_{22}^{-1}(A_{21}x + B_2u)$, and obtain a linear ordinary differential equation (ODE) $\dot{x} = Ax + Bu$. In some embodiments, the algebraic variables can be kept to preserve the behavior description of each component. In some embodiments, FT module 106 can apply the CFT to Equations (1)-(3) and obtain a set of algebraic equations in the frequency domain:

$$[j\omega I - A_{11}(p)]X(j\omega) - A_{12}(p)Z(j\omega) - B_1(p)U(j\omega) = x_0, \quad (4)$$

$$A_{21}(p)X(j\omega) + A_{22}(p)Z(j\omega) + B_2(p)U(j\omega) = 0, \quad (5)$$

$$Y(j\omega) - C_1(p)X(j\omega) - C_2(p)Z(j\omega) = 0. \quad (6)$$

The above set of equations, in fact, represents an infinite set of equations because they have to be satisfied at each (linear) frequency $f$, where $\omega = 2\pi f$ is the angular frequency. For simplicity of expression, this disclosure sometimes omits the linear or angular qualifiers when referring to $f$ and $\omega$, respectively. The behavior of the SUT can be observed through output measurements represented as time series. Their representation in the frequency domain can be achieved by computing their discrete Fourier transform (DFT). More specifically, FT module 106 can perform the DFT on the output measurements. When the time series is represented as a finite number of samples, the CFT can be approximated by $$Y(j\omega) \approx h \sum_{k=0}^{N-1} y_k e^{-j\omega kh},$$

where h is the sampling period and N is the number of samples. By evaluating the previous expression at discrete frequencies $$f = nf_0 = \frac{n}{Nh},$$

for $n \geq 0$, one can approximate the CFT by the discrete FT (DFT):

$$Y(j\omega_0 n) \approx hY_d(n) = h \sum_{k=0}^{N-1} y_k e^{-j2\pi \frac{kn}{N}}, \text{ with } \omega_0 = 2\pi f_0 = 2\pi \frac{1}{Nh}.$$

The accuracy of the approximation depends on the sampling period h and the number of samples N. Shorter period and larger N can increase the approximation accuracy.

In some embodiments, FT module 106 can apply the DFT to approximate the CFT of the finite time series that corresponds to the output measurements as well as the input signals. The frequency-domain representations of the inputs and outputs can be used in concert with the frequency-domain model of the SUT. However, the CFT of the measured outputs cannot be directly compared to the simulated outputs in the frequency domain, even when ignoring the approximation errors. This is because the CFT of the simulated output is computed over the entire time domain. For example, assume that input signal u is known up to time T only; therefore, when performing the DFT, FT module 106 can first use zero padding for all times greater than T. When this input is used in the model, the simulated output contains a transient period after T that is captured in the theoretical CFT from the model. However, this is not the case when computing the DFT of the measured output since the output samples can be obtained up to time T only. Hence, in addition to performing the CFT, FT module 106 needs to correct the CFT of the model output.

Let $\hat{y}_1(t)$ be the response of the model to the input signal known up to T. The model response after T is the impulse response (zero input) of the SUT with initial conditions recorded at time T, namely x(T), delayed by T seconds. Formally, this can be expressed as $\hat{y}_0(t) = C_1\tilde{x} + C_2\tilde{z}$, where $$\dot{\tilde{x}} = A_{11}\tilde{x} + A_{11}\tilde{x}, \; \tilde{z}(0) = x(T)$$

$$0 = A_{21}\tilde{x} + A_{22}\tilde{z}.$$

Therefore, the model output whose CFT is compared to the approximate CFT of the measurement vector is $\hat{y}(t)=\hat{y}_1(t)-\hat{y}_0(t-T)$. The Fourier transform of $\hat{y}_1(t)$ is given by $$\hat{Y}(j\omega)=\hat{Y}_1(j\omega)-e^{-j\omega T}\hat{Y}_0(j\omega) \quad (7)$$

Note that to evaluate the previous expression one needs to know the state values at T, i.e., x(T). For a large enough T, however, the significance of the second term in Equation (7) is reduced and we can ignore it.

Theoretically, the model equations in the frequency domain should be satisfied for all possible frequencies. In practice, when computing the DFT, one only needs to consider N frequencies of the form $\omega_n=2\pi n f_0$, with $$f_0 = \frac{1}{hN}.$$

Hence, the comparison between the measured and simulated outputs can be done for N frequencies only. Even among these N frequencies, some of them may not be informative since they contain no energy and thus can be discarded, reducing the number of frequencies at which the comparison needs to be performed. More importantly, the comparison at each frequency can be done independently, leading to the possibility of parallel implementation of at least part of the diagnosis related computations.

In some embodiments, the fault-diagnosis system can be configured to consider only parametric faults. This means that the system detects fault by detecting changes generated by drifts in the parameter values. This is not as constraining as it may seem. Moreover, a variety of parameterized fault models can be developed based on the physics of failure. In some embodiments, an initial nominal model of the SUT can be augmented with different fault modes, each mode depending on one or more parameters. The types of faults introduced are domain-dependent. In some embodiments, the fault-diagnosis system can detect faults in a number of domains, including but not limited to: electrical (short, open connections, parameter drifts), mechanical (broken flanges, stuck, torque losses due to added friction, efficiency losses), and fluid (blocked pipes, leaking pipes) domains.

Optimization-Based Fault Detection

Figure 2:
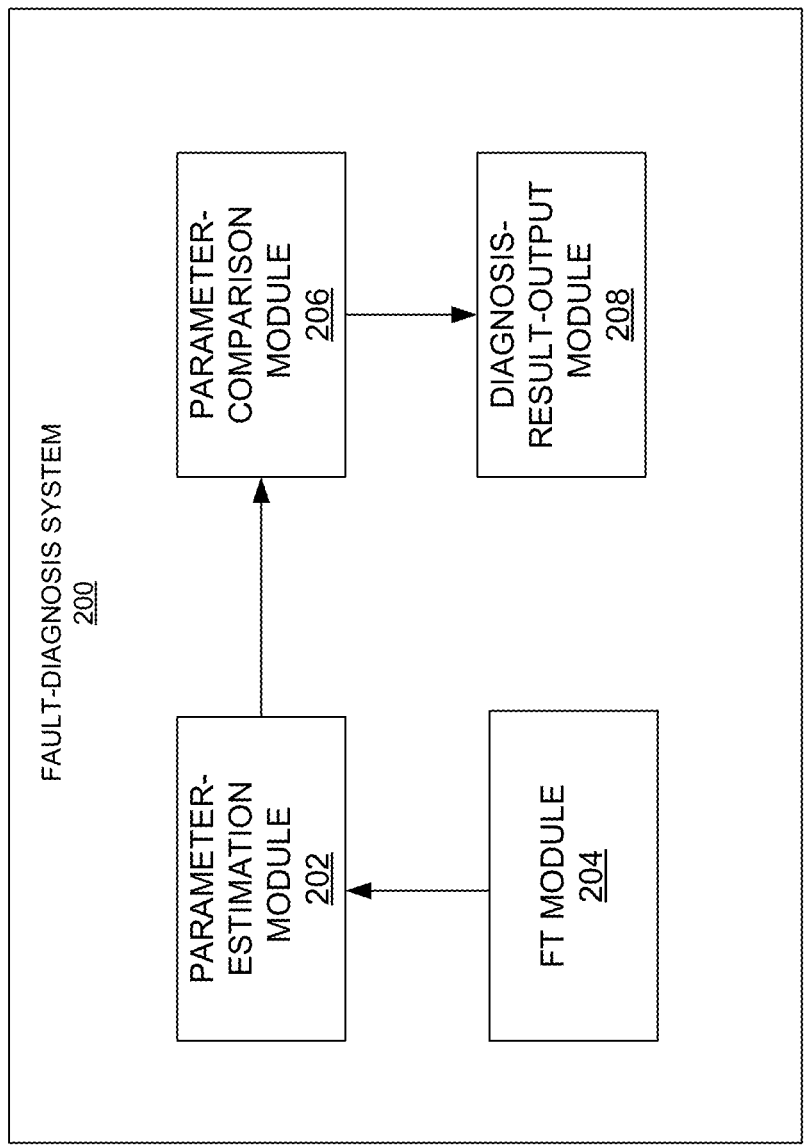
FIG. 2 shows an exemplary fault-diagnosis system, according to one embodiment.

FIG. 2 shows an exemplary fault-diagnosis system, according to one embodiment. Fault-diagnosis system 200 can include a parameter-estimation module 202, an FT module 204, a parameter-comparison model 206, and a diagnosis-result-output module 208. Parameter-estimation module 202 is responsible for estimating the parameters of the SUT using field data, including input signals and output measurements. The field data is represented by input and output time series of length N over the time interval [0, T], sampled at sampling period h (T=hN). More specifically, the input and output time series can be expressed as $\{u_k\}_{k=0}^{n-1}$ and $\{y_k\}_{k=0}^{n-1}$, respectively.

FT module 204 can compute the approximate CFT of the time series and generate the frequency series $\{U_n\}_{n=0}^{N-1}$ and $\{Y_n\}_{n=0}^{N-1}$, where $Y_n=Y(j\omega_n)$ with $$\omega_n = \frac{2\pi n}{hN}.$$

Using $\{U_n\}_{n=0}^{N-1}$ as the input for the frequency-domain model, we can compute the simulated output $\{\hat{Y}_n\}_{n=0}^{N-1}$ according to Equation (7). A cost function can be defined as $$J(p) = \frac{1}{2N}\sum_{n=0}^{N-1} J_n(p),$$

where $J_n(p)=\|Y_n^{re}-\hat{Y}_n^{re}\|^2+\|Y_n^{im}-\hat{Y}_n^{im}\|^2$. The terms $Y_n^{re}$ and $Y_n^{im}$ are the real and imaginary parts of $Y_n$, respectively, and p is a vector of system parameters estimated by parameter-estimation module 202. In some embodiments, parameter-estimation module 202 computes the parameters as the solution of the non-linear least-square problem $$\min_{p} J(p) \quad (8)$$

$$\text{subject to: } p \in \mathcal{P}$$

where $\mathcal{P}$ is a constraint set. In other words, the algorithm finds optimal solution of the parameters of the SUT, given the input and output values of the SUT as well as the frequency-domain model of the SUT. The constraint set ensures that the system parameters take values that physically make sense. For example, the resistance of an electrical resistor must be positive. For box type constraints, i.e., $p_i^{min} \leq p_i \leq p_i^{max}$, where $p_i$ is an entry of p, one can transform the constrained optimization problem represented by Equation (8) into an unconstrained one by applying the transformation $$p_i = p_i^{min} + [\sin(\tilde{p}_i) + 1]\frac{p_i^{max} - p_i^{min}}{2},$$

and minimizing $J(\tilde{p})$. Similar transformations can be used when the parameters are only partially bounded. For example, if $-\infty < p_i \leq p_i^{max}$, then $$p_i = p_i^{max} + 1 - \sqrt{\tilde{p}_i^2 + 1};$$

and if $p_i^{min} \leq p_i \leq \infty$, then $$p_i = p_i^{min} - 1 + \sqrt{\tilde{p}_i^2 + 1}.$$

Equations (4)-(6) are not explicitly included as equality constraints, because they are solved explicitly for each $\omega_n$. In some embodiments, parameter-estimation module 206 may use both gradient-free and gradient-based optimization methods to solve the unconstrained optimization problem. Both methods rely on model simulations. For gradient-based methods, in the best case scenario, the gradient vector may be symbolically obtained. When this is not the case, possible options can include automatic differentiation or numerical approximations. Reasonable choices for gradient-based optimization methods are part of the class of non-linear least-square algorithms, such as trust-region-reflective and Levenberg-Marquardt, which take advantage of the cost function's structure. Gradient-free methods can include the Nelder-Mead algorithm, pattern search, and Powell's algorithm with its different versions. Both the gradient evaluations (in the case of gradient-based methods) and the cost function evaluations (in the case of gradient-free methods) can be done in parallel for each of the considered frequencies.

Parameter-comparison module 206 can be responsible for comparing the estimated parameters with the known parameters of the SUT. Any deviation or drifting of the parameters can indicate fault. For example, a resistor in an electrical system can have a certain resistance value R. However, based on the physical model of the electrical system, the inputs, and the outputs of the electrical system, parameter-estimation module 202 estimates the resistance of the resistor as $\hat{R}$. Parameter-comparison module 206 compares R and $\hat{R}$ by calculating their difference; if the difference is greater than a threshold value, diagnosis-result-output module 208 outputs the diagnosis result, indicating the resistor being faulty.

Figure 3:
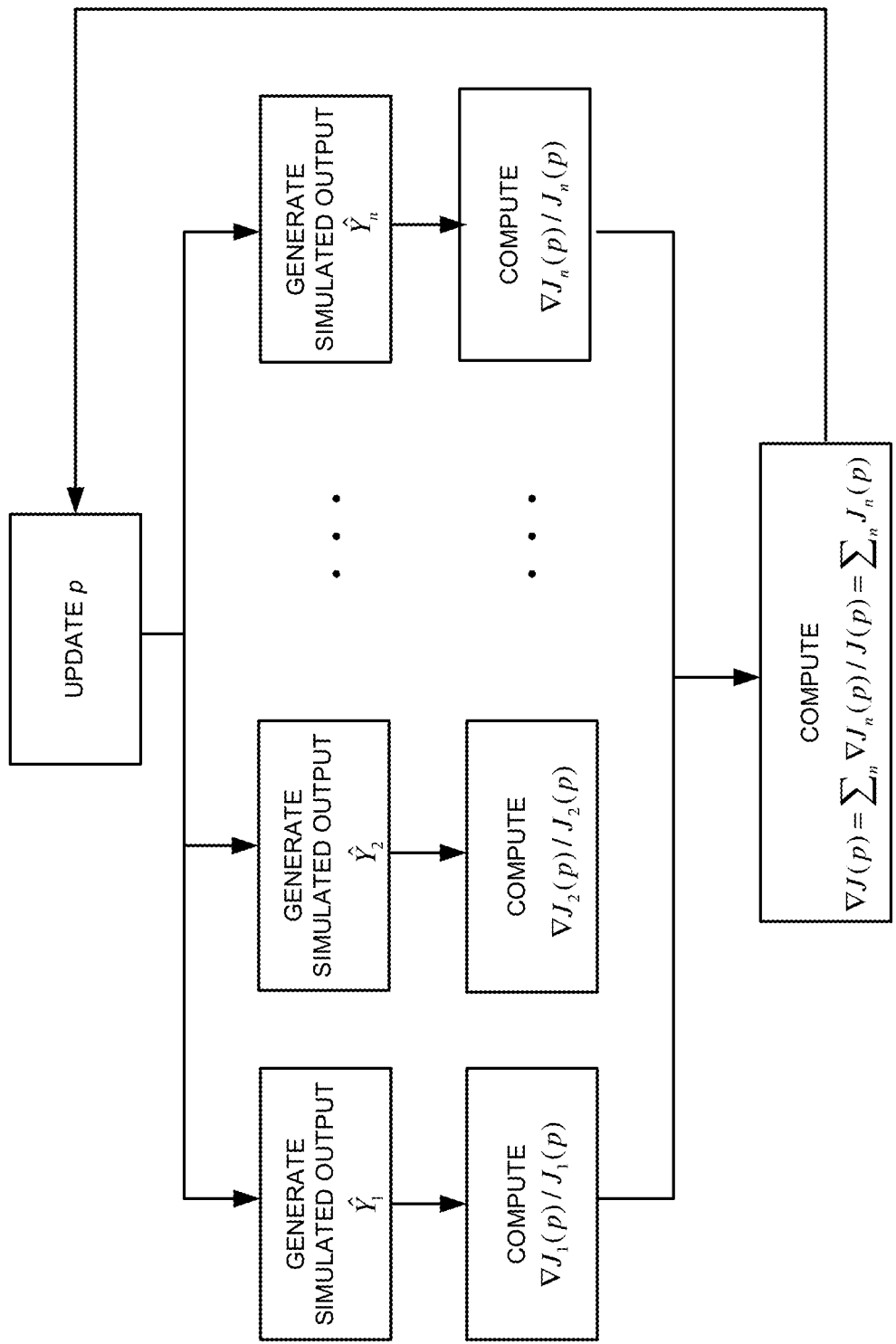
FIG. 3 illustrates exemplary computational operations of estimating the parameters, according to one embodiment.

FIG. 3 illustrates exemplary computational operations of estimating the parameters, according to one embodiment. More specifically, for each frequency, the algorithm generates simulated output ($\hat{Y}_i$) and computes the gradient. The algorithm then summarizes the computed gradient for all frequencies. The parallel computation of the gradient for all frequencies can significantly reduce the computational complexity and increase efficiency. The computational complexity can be further reduced by considering only frequencies with significant energy concentration. In some embodiments, the parameter-evaluation module can implement a threshold scheme. The threshold scheme selects frequencies at which sufficiently large energy concentrations in the inputs or outputs is present (e.g., $\Omega=\{\omega_n, |U(j\omega_n)| \geq \delta$ or $|Y(j\omega_n)| \geq \delta\}$).

The optimization problem represented by Equation (8) is usually non-linear and non-convex. Hence, there are no guarantees that the optimization algorithm converges to the global minimum. There is the option of using global optimization algorithms (e.g., particle swarm optimization, genetic algorithms, and evolution strategy), but they are usually slow.

Figure 4:
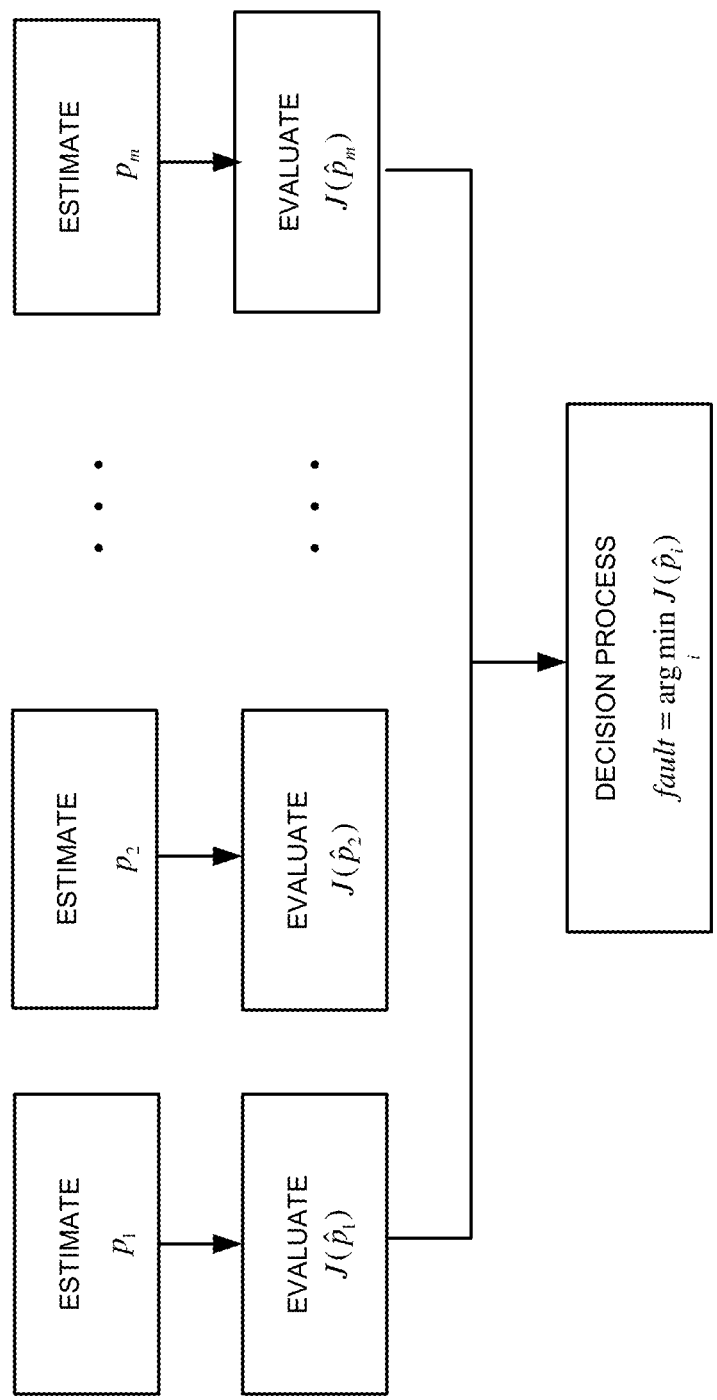
FIG. 4 illustrates exemplary computational operations, according to one embodiment.

To reduce the complexity in the optimization, in some embodiments, the system can consider single faults only and track, in parallel, one parameter at a time. FIG. 4 illustrates exemplary computational operations, according to one embodiment. In FIG. 4, a number (e.g., m) of parameters are tracked simultaneously, and an optimization problem is solved for each parameter $p_m$. After collecting the solutions for all m optimization problems, the cost function can be evaluated at each solution. At the final decision process, the parameter estimate that achieves the smallest cost function value is selected as the parameter responsible for the faulty behavior. If two parameters induce similar cost function values, the decision process will report both parameters as a possible cause. This means that the available data does not allow for distinguishing between the two parameters.

Figure 5:
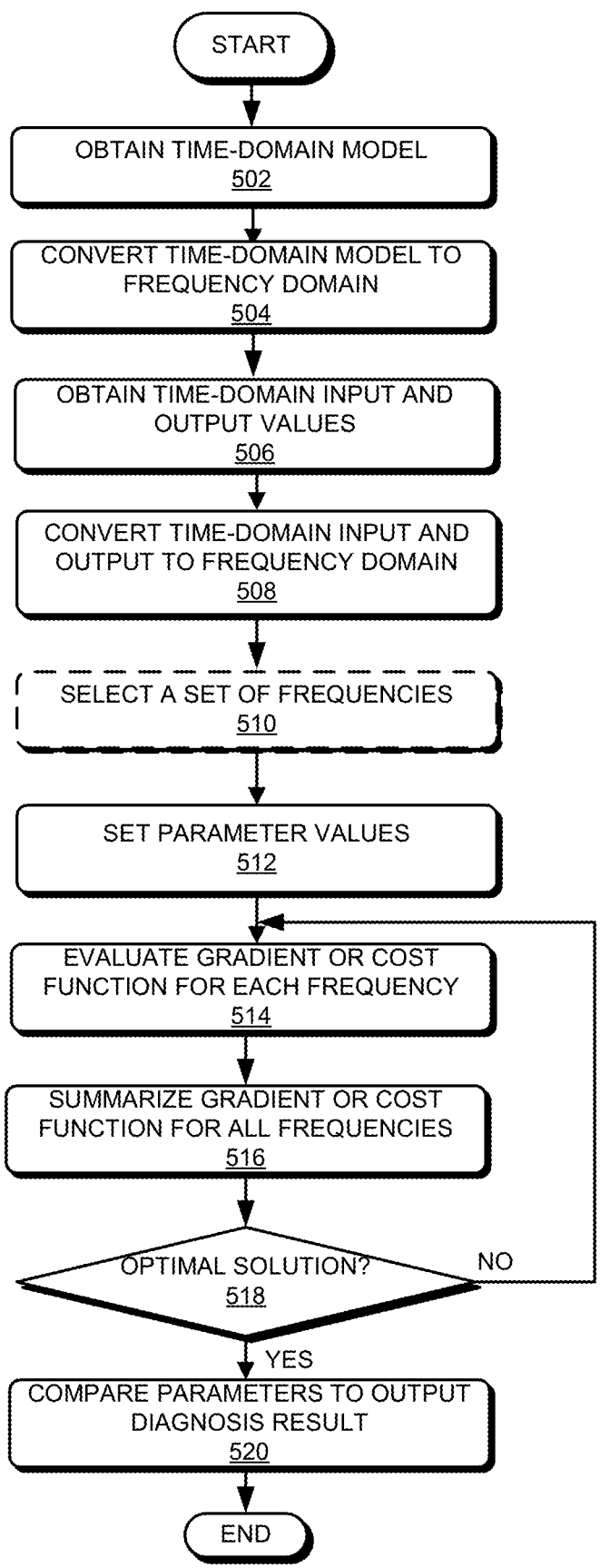
FIG. 5 presents a flowchart illustrating the exemplary operation of a fault-diagnosis system, according to one embodiment.

FIG. 5 presents a flowchart illustrating the exemplary operation of a fault-diagnosis system, according to one embodiment. During operation, the system obtains a time-domain model of the SUT (operation 502) and converts the time-domain model to the frequency domain (operation 504). Note that, if the SUT includes only linear components, converting the time-domain model to the frequency domain can be simply done using FT. However, if the SUT includes non-linear components, a machine-learning process may be needed to learn the behavior of the non-linear components in the frequency domain in order to construct a frequency-domain model of the entire SUT.

The system can also obtain time-domain input and output values represented as time series (operation 506). The input values can include known operation conditions, whereas the output values can include measurement data provided by a number of sensors. In certain scenarios, the input values may be also be obtained using sensors. The system converts the time-domain input and output values to the frequency domain (operation 508). Note that, in some embodiments, the system needs to correct the errors caused by approximating the CFT using DFT techniques.

The system can optionally select a subset of frequencies based on the amount of energy included in the input or output at each frequency (operation 510). For example, a frequency may be selected only if the input or output magnitude at such a frequency exceeds a threshold value.

The system subsequently sets an initial set of parameters (operation 512), and evaluates the gradient or cost function for each frequency (operation 514). In some embodiments, such evaluations can be done in parallel for all selected frequencies. The system summarizes the gradient or cost function for all frequencies (operation 516), and interactively updates the parameters (i.e., repeating operations 514 and 516) until an optimal solution is reached (operation 518). Once the optimal solution has been reached, the system compares the estimated parameters with known parameters to output a diagnosis result (operation 520)

In the above analysis, it is assumed that the state initial conditions and the state values at T are known. If this is not the case, one can extend the vector of parameters to include x(0) and x(T). Alternatively x(T) can be estimated in the optimization procedure by simulating the time-domain model up to time T As previously mentioned, for a large enough T, the last term of $\hat{Y}(j\omega)$ is small enough to be ignored and, hence, there will no longer be a need to know x(T).

In some embodiments, the parameter-estimation module can use the procedure described in FIGS. 3-5 to track the parameter evolution over time. In practice, the parameter-estimation module can collect time series of inputs and outputs over time and apply the algorithms described above to track parameters, thus achieving a semi-online optimization-based diagnosis engine.

Filtering Methods

In some embodiments, the parameter-estimation module may treat parameters of interest as states of the SUT and use filters for state estimation. In further embodiments, the parameter-estimation module can implement a particle filter for state estimation and apply the particle filter in the frequency domain. The particle filter is a model-based, Monte Carlo method that approximates the conditional probability of the state, given a set of observations. It works well with non-linear and non-Gaussian noise. It may require, however, a large number of particles to generate a good approximation of the conditional probability distribution. In a simplified model, T is assumed to be sufficiently large so that the second term of Equation (7) does not play an important role.

A frequency domain model can be described by:

$$p_n = \max\{p_{min}, \min\{p_{max}, p_{n-1}+w_n\}\}, \quad (9)$$

$$x_0 = [j\omega_n I - A_{11}(p_n)]X_n - A_{12}(p_n)Z_n - B_1(p_n)U_n, \quad (10)$$

$$0 = A_{21}(p_n)X_n + A_{22}(p_n)Z_n + B_2(p_n)U_n, \quad (11)$$

$$Y_n^{re} = Re\{C_1(p_n)X_n + C_2(p_n)Z_n\} + v_n^{re}, \quad (12)$$

$$Y_n^{im} = Im\{C_1(p_n)X_n + C_2(p_n)Z_n\} + v_n^{im}, \quad (13)$$

Equation (9) represents the assumption that the parameter dynamics are "roughly" constant. The min and max operators make sure the parameter values are within their physical bounds. The vector $w_n \sim \mathcal{N}(0, \Sigma_w)$ is a white Gaussian noise with a small variance to encourage exploration of parameter values. The model further includes a regularization noise as well in the measurement model equation, namely $v_n^a \sim \mathcal{N}(0, \Sigma_v^a)$, with $a \in \{re, im\}$ and $x_0 \sim \mathcal{N}(\mu_0^x, \Sigma_0^x)$ is a vector-valued Gaussian random variable. The model can assume some arbitrary distribution for $p_{-1}$ with mean determined based on some initial guess for the parameter values. Note that the index n, unlike the time domain, represents a particular frequency, namely $\omega_n$.

The particle filter algorithm approximates the probability $pr(P_n|Y_{0:n}^{re}, Y_{0:n}^{im})$ using a set of sample points $\{p_n^i\}_{i=1}^{N_s}$ called particles. Each particle has an associated weight $\alpha_n^i$ that is updated any time new measurements are available. It follows that the parameter estimate is computed according to $\hat{p}_n \approx \Sigma_{i=1}^{N_s} \alpha_n^i p_n^i$. FIG. 6 shows a particle filter algorithm applied in the frequency domain, according to one embodiment.

As shown in line 3 of FIG. 6, new particles can be generated based on previous value (prediction step). In practical terms, the model first samples from the noise to obtain $w_n$ and then applies Equation (9) to generate new particles. The random variable $Y_n^{re}|p_n^i$ has a Gaussian distribution with parameters $pr(Y_n^{re}|p_n^i)=pr(Y_n^{re}|X_n^i, Z_n^i) \sim \mathcal{N}(Re\{C_1(p_n^i)X_n^i + C_2(p_n^i)Z_n^i\}, \Sigma_v^{re})$. Similarly, $pr(Y_n^{im}|p_n^i) \sim \mathcal{N}(Im\{C_1(p_n^i)X_n^i + C_2(p_n^i)Z_n^i\}, \Sigma_v^{im})$.

The operations of a particle-filter-based fault-diagnosis system can be very similar to the one shown in FIG. 5, except that, instead of evaluating gradient or cost function for optimization purposes, the fault-diagnosis system calculates the weight of the particles for each frequency.

Fault Detection Based on Analytic Redundancy Relations

The projection on the frequency domain of the system dynamics generates a set of algebraic equations. These equations can be used to produce analytical redundancy relations (ARRs) that represent various constraints between a set of known process variables. ARRs can be expressed as $f(U_n, Y_n, p) = 0$, where $f$ is a vector valued constraint map, and the index n refers to the $n^{th}$ considered frequency. Checking if the ARRs are satisfied is done through the evaluation of a residual function, by using the actual input and output measurements and the system parameters: $r_n = eval[f(U_n, Y_n, p)]$. Ideally, ARRs should be robust (insensitive to unknown quantities), sensitive to faults, and structured (only a subset of the ARR is not satisfied for a given fault). The number of ARRs equals the number of sensors, denoted by m. The decision procedure is usually based on a binary coherence vector $c = [c_1, c_2, \ldots, c_m]$, where $$c_i = \begin{cases} 1, & max_n |r_n^i| > \delta_i \\ 0, & otherwise \end{cases} \quad (14)$$

where $r_n^i$ is the i-th entry of the residual vector $r_n$.

The model can take the maximum over all frequencies to accommodate for the possibility of the signals having little to no energy at certain frequencies. In such a case the residuals are trivially zero. To account for the modeling uncertainties and the errors introduced by the CFT approximations, the thresholds need to be adaptive. A fault is detected if $c \neq [0, 0, \ldots, 0]$, that is, at least one element in the coherence vector is non-zero. A fault can be isolated by matching the coherence vector to a binary fault signature matrix (FSM). The FSM denoted by S embeds the structural sensitivity of each residual to faults in the system components. The entries of the FSM are defined as:

$$S_{ji} = \begin{cases} 1, & \text{i-th residual is sensitive to j-th component} \\ 0, & \text{otherwise} \end{cases}.$$

A fault in a component is detectable if at least one residual is sensitive to it. Fault isolation can be performed using the FSM. Note that if there are too few sensors, the resulting ARRs may not be able to differentiate among some faults. The ideal case is when each residual is sensitive to only one fault. This type of residual is called a structured residual. If we try to monitor more faults than the number of sensors, we cannot construct structured residuals. The main advantage of ARRs is the fact that there is no longer a need to explicitly include the fault models. A fault appears when a significant change in the variables and parameters of a component takes place. Therefore, a residual is affected by a component fault if the parameters or the measurements corresponding to the component appear in the ARR.

ARRs can be determined using a structured approach, where a bipartite graph describes the dependence between the variables and the constraints that define the system behavior. If a variable appears in a constraint, then an edge in the graph exists between them. An advantage of working in the frequency domain is that there are no derivatives of variables. Hence, there can be fewer constraints. The structural analysis can be done through matching on the bipartite graph: system variables are associated with the constraints from which they can be computed.

ARRs are generated from over-constrained subsystems and are completely expressed when only known variables appear (inputs, outputs and parameters). The elimination of unknown variables can be done iteratively. At the first iteration, we find the variables that can be computed directly from the initial set of known variables. These found variables can then be added to the known variables set, which can be used to express additional unknown variables at the next iteration. The algorithm stops when all variables are expressed in terms of inputs, outputs, and parameters. The constraints that were unused in this process become the ARRs. This determines a structural dependency between known and unknown variables. This dependency may be broken for particular choices of system parameters. Because we are no longer constrained by the temporal causal correlations between variables, we can evaluate the residual vectors corresponding to the frequencies $\omega_n$ in parallel. This means that even when we consider a large number of frequencies, a diagnosis solution can be reached quickly.

Figure 7:
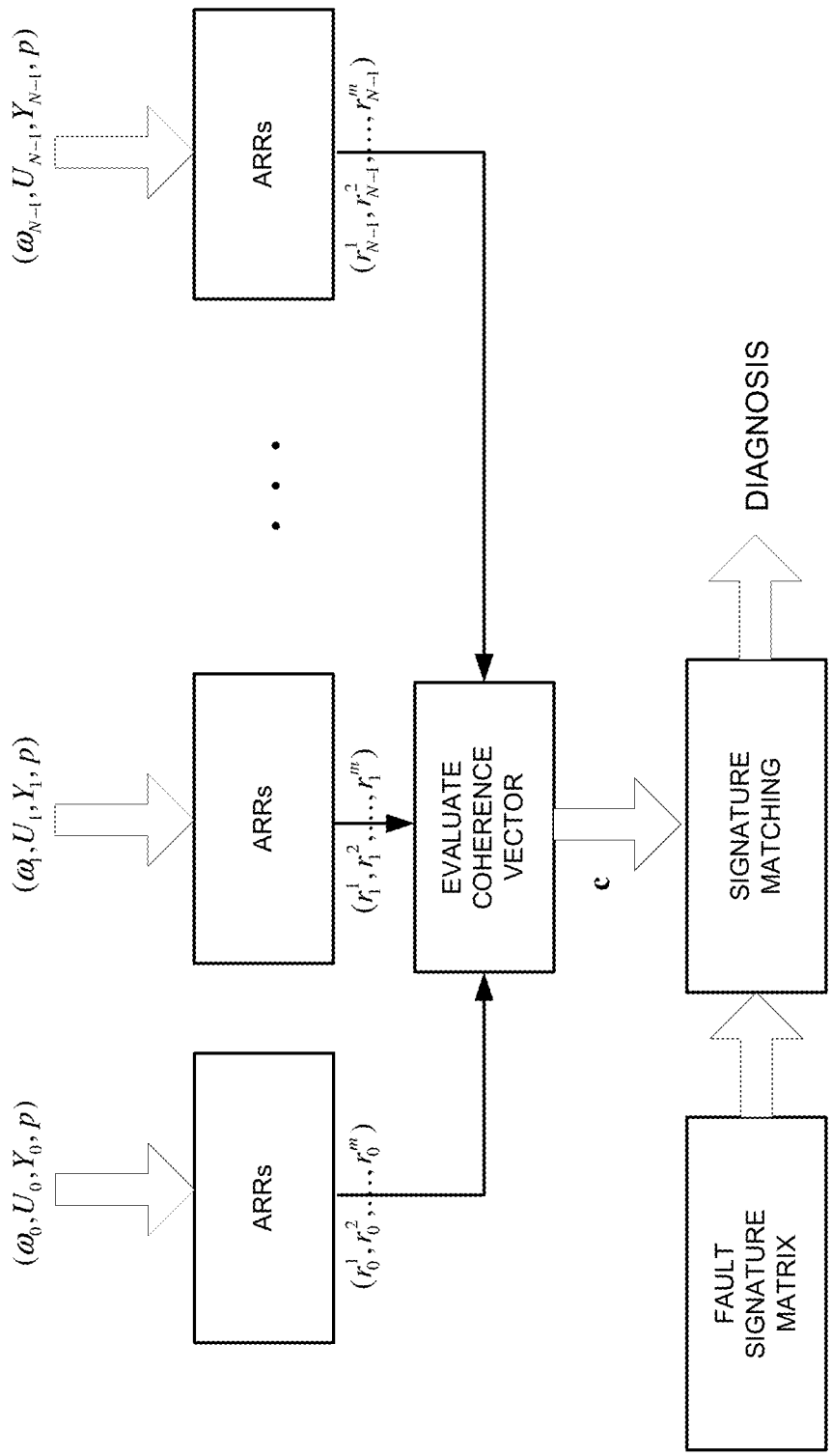
FIG. 7 illustrates the exemplary architecture of an analytic-redundancy-relation (ARR)-based diagnosis engine, according to one embodiment.

FIG. 7 illustrates the exemplary architecture of an ARR-based diagnosis engine, according to one embodiment. In FIG. 7, the residual functions can be evaluated for each frequency in parallel, and coherence factor c can be evaluated based on the residual functions. The resulting coherence factor can then be used for matching elements in the FSM in order to achieve a diagnosis result.

The operations of an ARR-based fault-diagnosis system can be very similar to the one shown in FIG. 5, except that, instead of evaluating gradient or cost function for optimization purposes, the fault-diagnosis system evaluates the residual vector for each frequency based on the ARRs.

Fault Diagnosis Example

Figure 8:
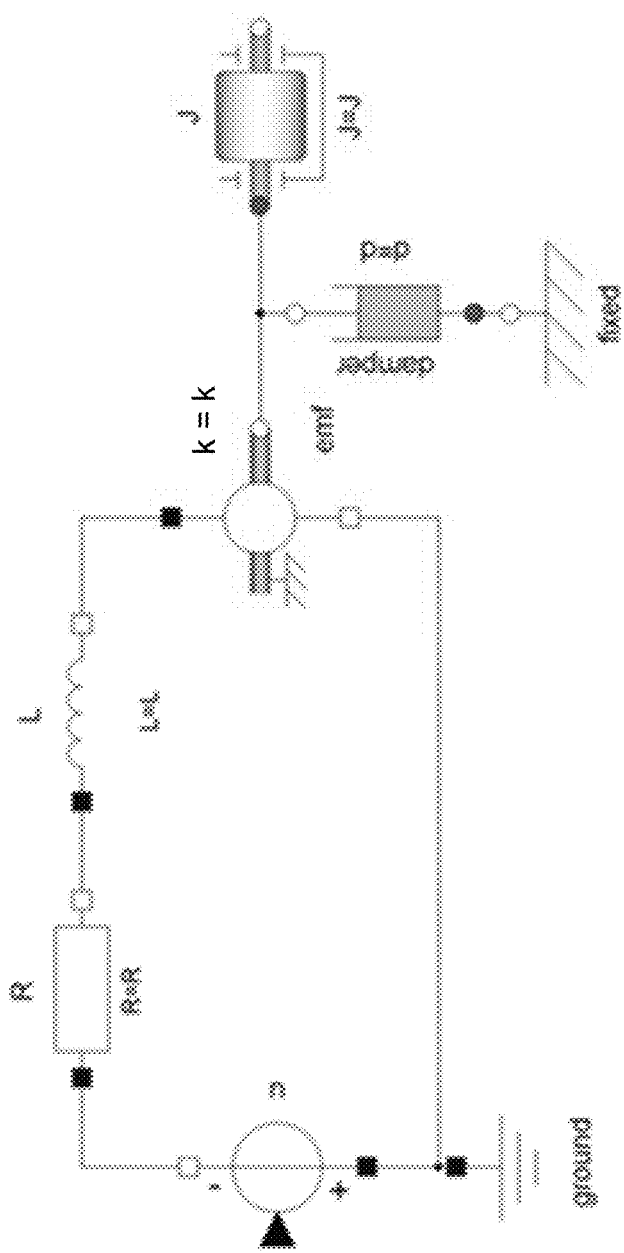
FIG. 8 shows the modeling diagram of a DC motor.

This section presents a practical example where fault diagnosis is performed for a DC motor. FIG. 8 shows the modeling diagram of a DC motor. The frequency-domain model of the DC motor can be expressed using the following equations:

$$RI_L - V_R = 0 \quad (A)$$

$$j\omega I_L - \frac{1}{L}V_L = i_{L0} \quad (B)$$

$$V_L + V_R + V_e = U \quad (C)$$

$$V_e - k\dot{\Theta} = 0 \quad (D)$$

$$T_e - kI_L = 0 \quad (E)$$

$$j\omega\dot{\Theta} - \frac{1}{J}T_J = \dot{\theta}_0 \quad (F)$$

$$T_d - d\dot{\Theta} = 0 \quad (G)$$

$$T_J + T_d - T_e = 0 \quad (H)$$

where U is the input voltage; $I_L$ is the current through the resistor, inductor, and the EMF components; $V_R$, $V_L$, and $V_e$ are the voltages across the resistor, inductor, and EMF component, respectively. In addition, $\dot{\Theta}$ is the angular velocity of the inertia, damper, and EMF; $T_e$ is the EMF's electromagnetic torque; $T_J$ is the torque applied to the inertial component; and $T_d$ is the torque loss due to the damper. The system's states are $X=[I_L, \dot{\Theta}]^T$, and the algebraic variables are $Z=[V_R, V_L, V_e, T_e, T_J, T_d]^T$. For reference purposes, the model equations (constraints) are named as Equations A-H. The default (known) model parameters include: R=1 Ohm, L=0.5 H, k=0.01, J=0.01 Kg·m², and d=0.1 N·m·s, where R is the resistor value, L the inductance value, k the electromotive force constant, J the moment of the inertia, and d the friction constant.

Figure 9:
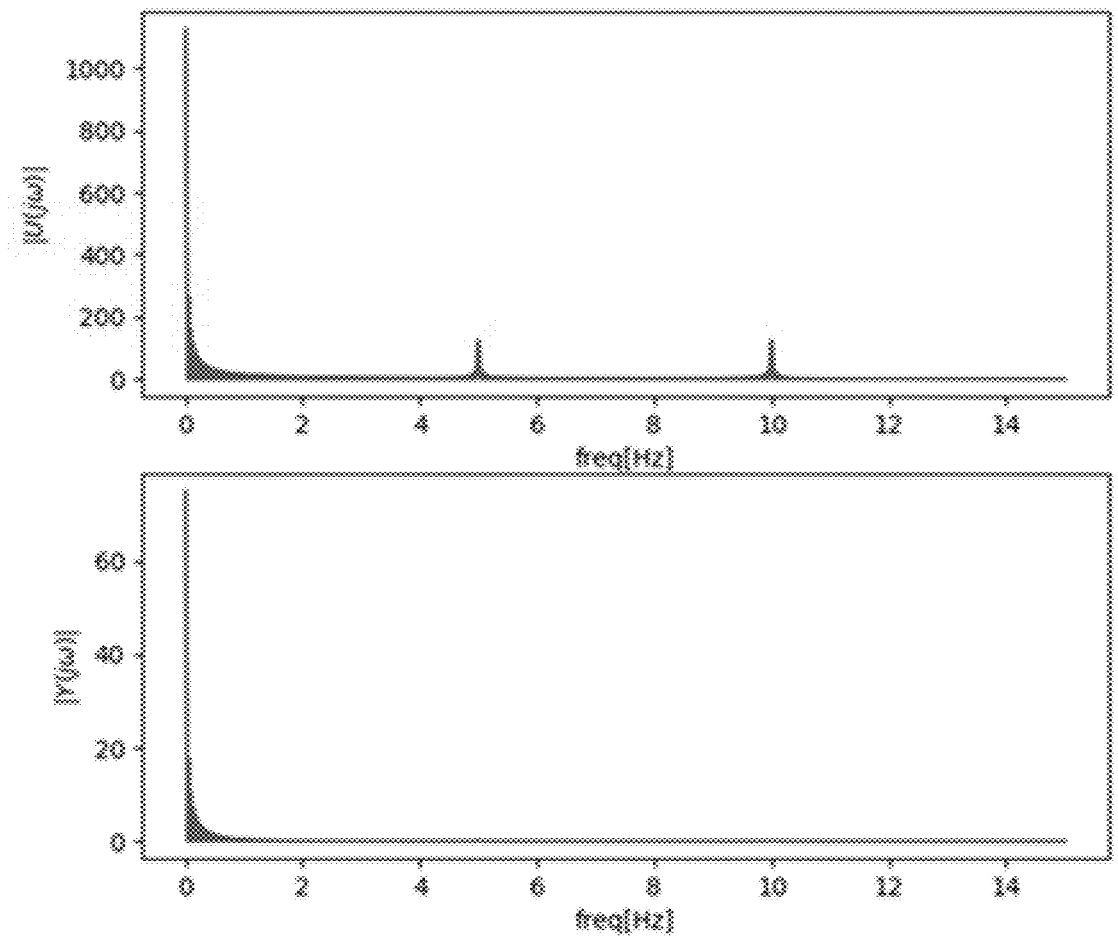
FIG. 9 shows the magnitudes of the input and output of the DC motor in the frequency domain.

In the example, the input can include both steady state and harmonic components: $u(t)=A_0+A_1 \sin(2\pi f_1 t)+A_2 \sin(2\pi f_2 t)$, where $A_0=50$, $A_1=A_2=10$, $f_1=5$ Hz and $f_2=10$ Hz. FIG. 9 shows the magnitudes of the input and output of the DC motor in the frequency domain. To obtain the frequency-domain signals, the time series of the input and output were sampled at 1000 Hz over a time window of 25 s, with zero initial conditions. Although small, the output magnitudes at 5 Hz and 10 Hz are non-zero. As expected the majority of the signal energy is concentrated at low frequencies. In the following discussion, the transient part of the simulated output (second term of Equation (7)) can be ignored.

In some embodiments, a fault-diagnosis system can use an optimization algorithm (e.g., the trusted-region-reflective non-linear least square algorithm) to estimate the system's parameters. The optimization procedure can be similar to the one shown in FIG. 3. In the example, only frequencies for which either the imaginary or the real parts of the input or the output signals are greater than 10 are considered, resulting in a total of 118 frequencies. The initial values of the parameters can be chosen as their default values. In some embodiments, the fault-diagnosis system may consider the single-fault case by tracking each parameter separately. This means that the system runs five optimization algorithms in parallel. Each of the algorithms estimates one single parameter from the set {R, L, k, J, d}. FIG. 10 displays two tables showing the optimization results, according to one embodiment.

The top table (Table I) in FIG. 10 depicts the real parameter values versus the estimated ones $\{\hat{R}, \hat{L}, \hat{k}, \hat{J}, \hat{d}\}$. Each row shows the optimization results when using data generated by a particular parameter. For example, the first row shows the optimization result using experimental data generated using the particular resistance value R, with all other parameters remaining their default values. Similarly, the second row shows the optimization result using experimental data generated using the particular inductance value L, with all other parameters remaining their default values.

The bottom table (Table II) in FIG. 10 presents the cost functions computed at the estimated parameter values, namely $J(\hat{p})$, where $\hat{p}\in\{\hat{R}, \hat{L}, \hat{k}, \hat{J}, \hat{d}\}$ is the estimated parameter value. The rows in Table II correspond to the rows in Table I.

As the tables show, the optimization algorithms tracking the parameter responsible for the fault generate the lowest cost values. Hence, diagnosis decisions can be easily made. For example, in the first row of Table II, the cost function $J(\hat{R})$ is the smallest, indicating that the resistor is the faulty component. In addition, the parameter estimates are almost identical to the parameter values that generated the "experimental" data. Therefore, for the single fault case this is an effective diagnosis method. To be comparable, the optimization algorithms used the same hyper-parameter values. Tracking all parameters simultaneously will not necessarily provide correct results since the faults are not distinguishable using the available output.

In some embodiments, the fault-diagnosis system can implement a particle filter, using an algorithm similar to the one shown in FIG. 6, in the frequency domain to estimate the parameters of the DC motor. Note that the implementation of the particle filter in the frequency domain requires the use of complex arithmetic. The real and imaginary parts essentially double the number of dimensions. The parameters of the particle filter are the variance of the process noise $\sigma_{w_n}$, the variances of the sensor noise $\sigma_{v_n}^{re}$ and $\sigma_{v_n}^{im}$, the number of particles Ns and the frequency step $\Delta_f$. Together, they determine the convergence properties of the filter. As in the example shown in FIG. 10, the output of the DC motor is the angular velocity $\dot{\theta}$. In real-life scenarios, the angular velocity of a DC motor can be obtained using a sensor coupled to the DC motor. Also note that the DC motor is a relatively simple system that has only one input (i.e., the input voltage) and one output (i.e., the angular velocity). Other more complex systems (e.g., airplane engines or wind turbines) may have multiple inputs and/or multiple outputs.

Figures 11, 12:
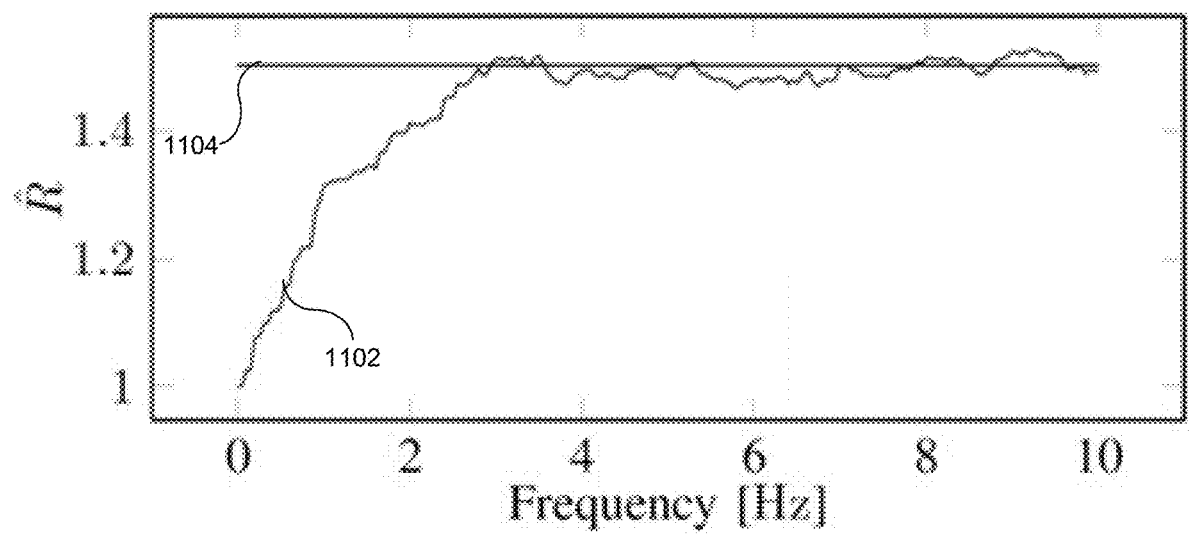
FIG. 11 shows the performance of a particle filter for estimation of a single fault, according to one embodiment.
FIG. 12 presents a table indicating the cost of the particle filters for the various single-fault scenarios, according to one embodiment.

In one experiment, only one parameter (e.g., the resistance of the resistor) is estimated at a time, and the number of particles is fixed to Ns=100. FIG. 11 shows the performance of a particle filter for estimation of a single fault, according to one embodiment. More specifically, curve 1102 indicates estimated resistance values, whereas straight line 1104 indicates the injection of fault (i.e., fault occurs at this resistance value). From FIG. 11, one can see that very good convergence properties can be achieved even for the small number of particles. In this example, the frequency step is fixed as $\Delta_f=50$ mHz in all particle filter experiments.

FIG. 12 presents a table indicating the cost of the particle filters for the various single-fault scenarios, according to one embodiment. More specifically, Table III shows the cost J of the particle filters for estimating single parameters. The "true" parameter values are the same as those in Table II. Table III also presents the process noise associated with each fault variable. The sensor noise variance has been kept small in all experiments. More specifically, $\sigma_{v_n}^{re}=\sigma_{v_n}^{im}=1e-7$. The results show that the estimation error for single-faults is always small and that the particle filter performs well for all possible single-fault, single-parameter estimation problems.

Figure 13:
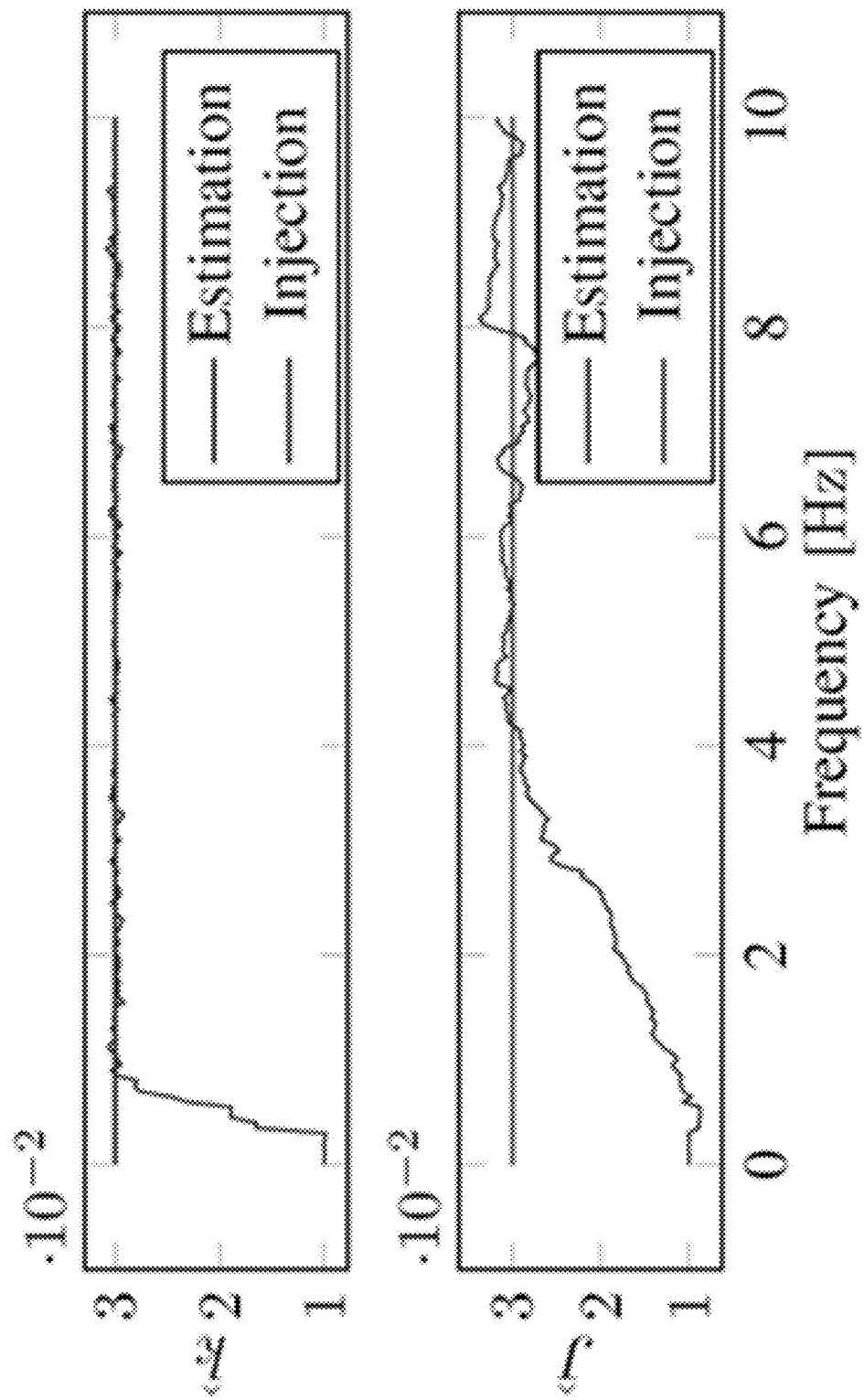
FIG. 13 shows the performance of a particle filter for estimating two fault variables, according to one embodiment.

In some embodiments, a particle filter may also be used to estimate two fault variables. FIG. 13 shows the performance of a particle filter for estimating two fault variables, according to one embodiment. In the example shown in FIG. 13, the particle filter jointly estimates $\hat{J}$ and $\hat{k}$. In this example, the particle number is set as: Ns=1000 particles. As one can see from FIG. 13, the convergence rate for $\hat{k}$ is better than the convergence of $\hat{J}$. This can be due to the different effects of each fault on the output. More specifically, changes in $\hat{k}$ show larger changes in the output. The advantage of using a particle filter for fault diagnosis is that it is straightforward to implement and does not need Jacobian matrices.

In alternative embodiments, the fault-diagnosis system can implement ARR-based diagnosis algorithms to diagnose faults in the DC motor. More specifically, the architecture of the diagnosis engine can be similar to the one shown in FIG. 7. The number of ARRs is given by the number of sensors, denoted by $N_{ARR}$. As a result, the maximum number of modes that can be differentiated is $2^{N_{ARR}}$. In the current example, at least two sensors are coupled to the DC motor to measure the angular velocity $\dot{\theta}$ and the resistor voltage $V_R$. Hence, up to four modes can be distinguished. One can assume the initial conditions $i_{L0}$ and $\dot{\theta}_0$ are known. The ARRs follow by solving for the unknown variables using the least number of steps. The set of the unknown and known variables are $\{I_L, V_L, V_e, T_J, T_d\}$; and $\{V_R, U, \dot{\Theta}, i_{L0}, \dot{\theta}_0\}$, respectively. To eliminate the unknown variables, one can first construct the incidence matrix of the model, and then apply the causal matching on the incidence matrix to solve for the unknown variables. FIG. 14A shows steps in the casual assignment propagation, according to one embodiment. More specifically, the steps are numbered sequentially in FIG. 14A. In the first step, $I_L$, $V_e$, $T_J$, and $T_d$ can be computed from the constraint Equations (A), (D), (F), and (G), respectively. In the second step, with the augmented set of known variables, the last two unknown variables $V_L$ and $T_e$ are determined from constraint Equations (B) and (E), respectively. Once a path to compute all unknown variables has been determined, constraint Equations (C) and (H) can be identified as the ARRs, because they were not used for computing the unknown variables. Hence, the residuals used for generating the coherence vectors are $r_n^1 = V_{L,n} + V_{R,n} + V_{e,n} - U_n$, and $r_n^2 = T_{J,n} + T_{d,n} - T_{e,n}$, where index n refers to frequency $\omega_n$. The entries of the coherence vector can be computed according to formula (14).

The final step is the construction of the FSM. To do so one needs to find the parameters to which the two ARRs are sensitive. A simple way to determine this sensitivity is to look at each variable in the ARRs and determine if, in the process of computing it, a certain parameter was used or not. For example, Equation (C) is sensitive to R, L and k. Indeed, $V_e$ is computed from Equation (D), which depends on k. On the other hand, $V_L$ is determined from Equation (B), which depends on L and $I_L$. Finally, $I_L$ is computed from Equation (A), which involves R.

FIG. 14B shows the constructed FSM, according to one embodiment. As expected, with only two sensors there will be some ambiguity when diagnosing parameter drifts. In particular, the signatures corresponding to parameters R and k are identical. A similar situation can be found in the case of parameters J and d. Note that the FSM is valid for all frequencies. When making a diagnosis, we compute the residual vectors for each frequency. A fault is declared if a signature corresponding to a fault mode is found for at least one frequency. All computations are executed using complex number arithmetic.

Note that here the diagnosis operation is performed for a simulated system instead of a real physical system. The outputs are simulated outputs. Because DFTs are used to approximate the CFTs in the simulation and the transient part of the simulated output (second term of Equation (7)), the nominal residuals will not be zero. Hence, one needs to determine threshold values applied in Formula (14). By simulating the model in the nominal case, we selected $\delta_1 = 4$ and $\delta_2 = 0.005$. Note that one needs to care about the maximum values of the nominal residuals, which will be used as fault triggers.

Figure 15A:
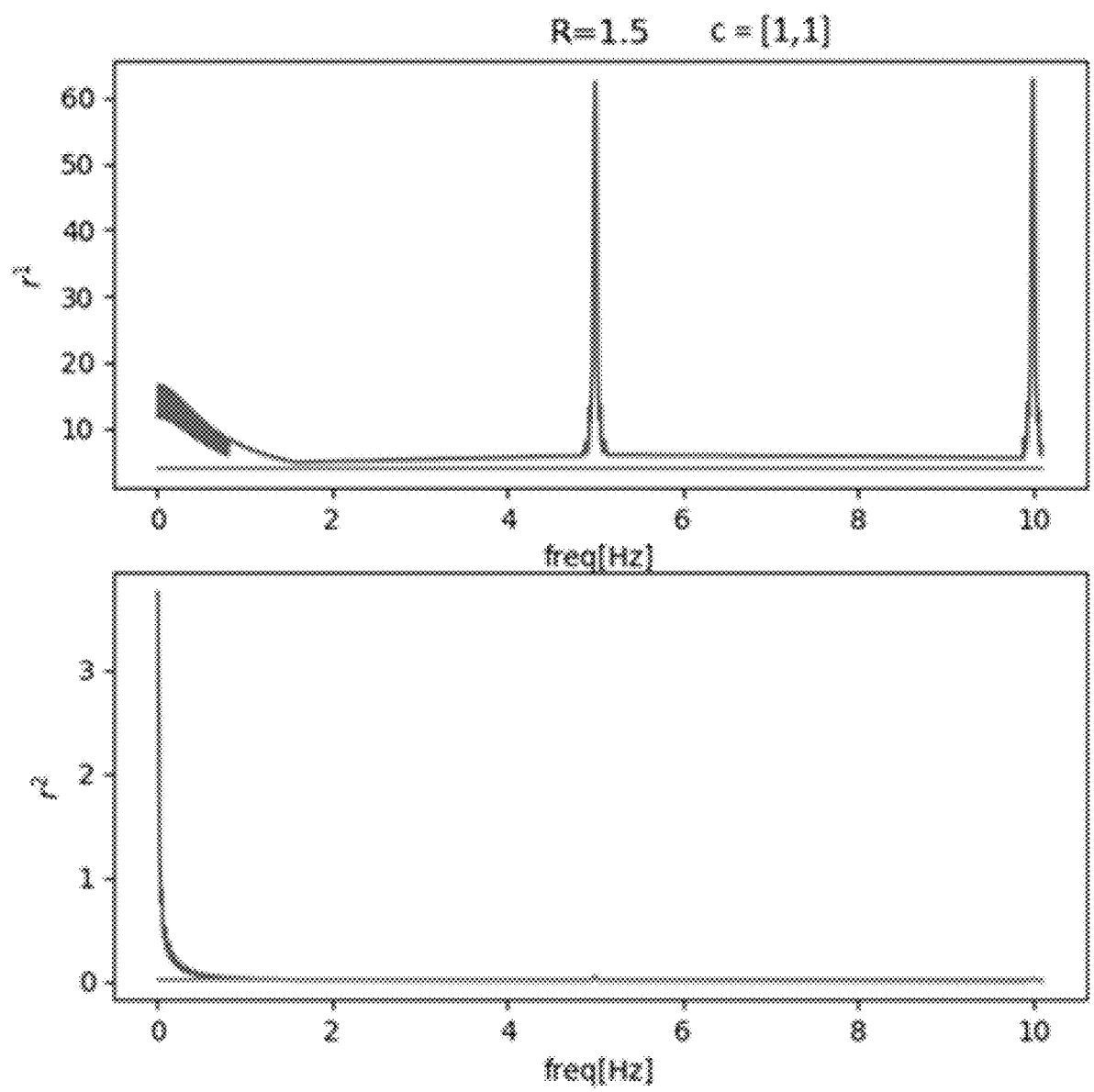
FIGS. 15A-15C show the computed residuals in the frequency domain, according to one embodiment.
Figure 15B:
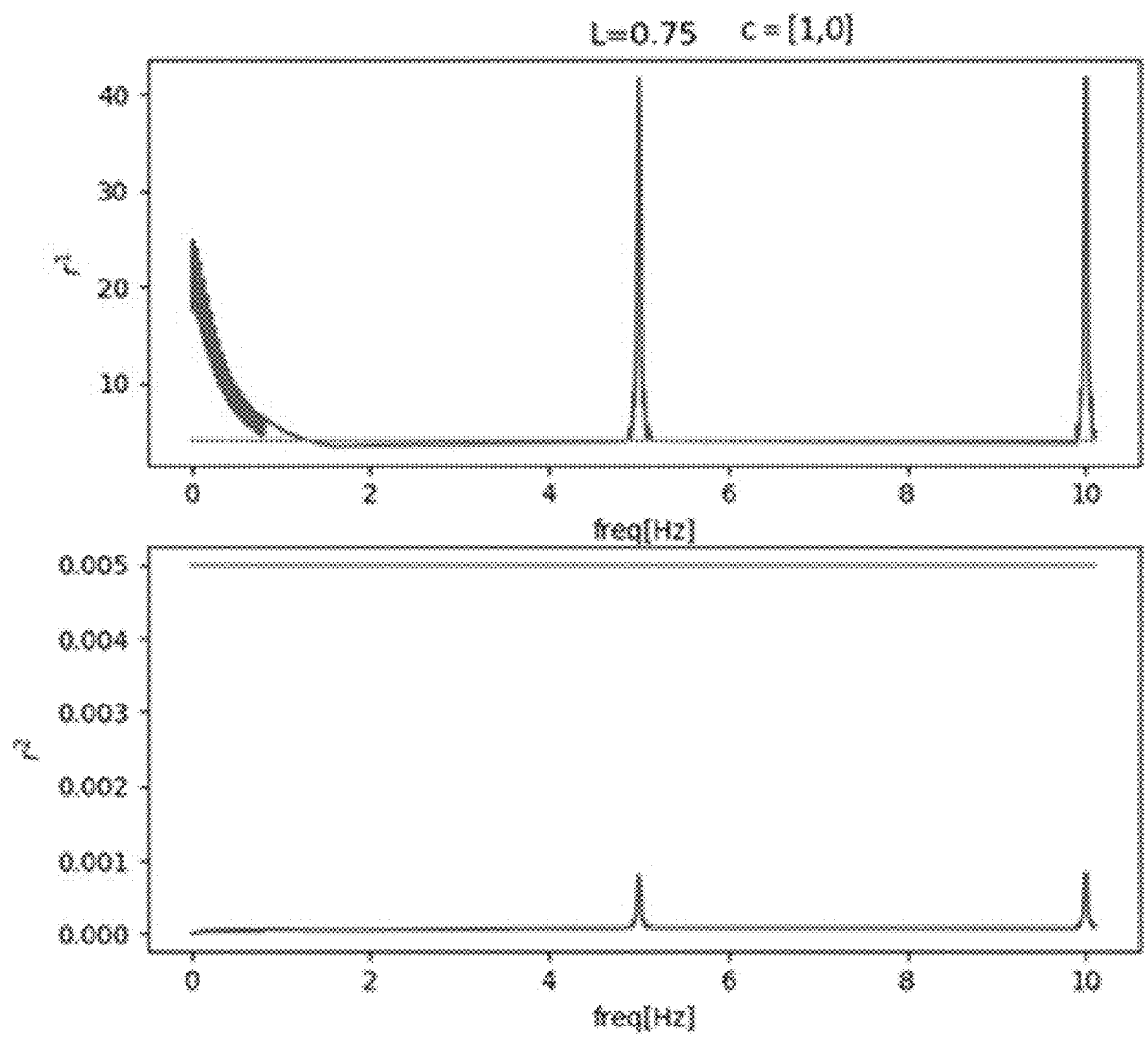
Figure 15C:
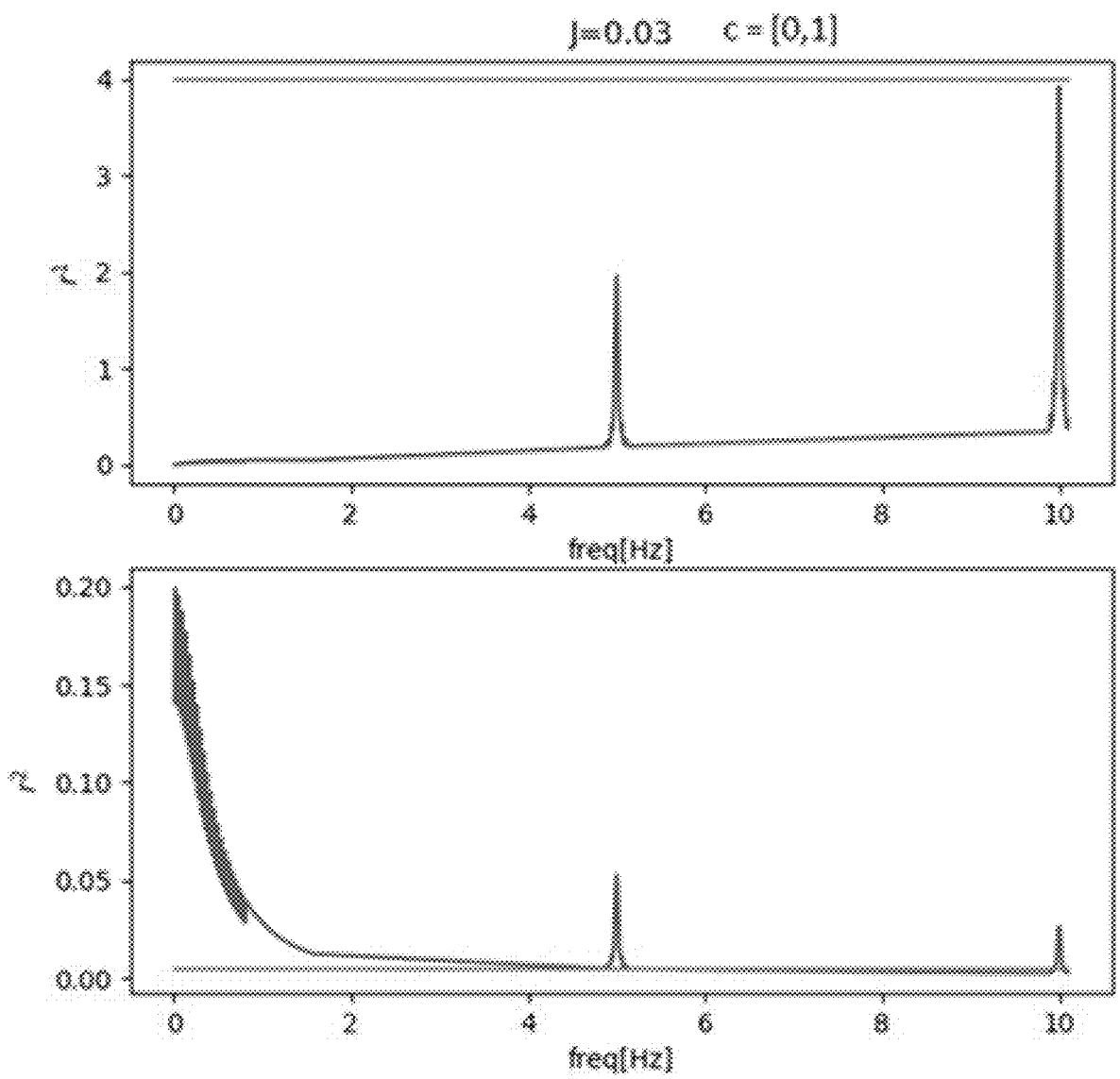

Simulated faulty DC motors can be constructed using parameter values different from their default values. The ARR-based diagnosis engine can be used to detect and distinguish between the fault modes. FIGS. 15A-15C show the computed residuals in the frequency domain, according to one embodiment. In each figure, the top and bottom drawings show the residuals corresponding to constraint Equations (C) and (H) (i.e., $r^1$ and $r^2$), respectively. More specifically, FIGS. 15A-15C show the residuals for faulty parameters R, L and J, respectively. The straight lines in the top and bottom drawings of each figure represent $\delta_1$ and $\delta_2$, respectively. The coherence vector c is shown in each drawing as well.

From FIGS. 15A-15C, one can see that indeed the coherence vector matches what is expected from the FSM for the different fault modes. For example, in the scenario shown in FIG. 15A, the fault mode involves a faulty R. According to the FSM shown in FIG. 14B, the coherence vector is [1, 1], which matches the coherence vector generated based on the residuals shown in FIG. 15A. Similarly, in the scenario shown in FIG. 15B, the faulty parameter is L. According to the FSM shown in FIG. 14B, the coherence vector is [1, 0], which matches the coherence vector generated based on the residuals shown in FIG. 15B. This demonstrates that even with the errors introduced by the numerical approximations, the ARR approach in the frequency domain can ensure accurate diagnosis results. Benefits provided by the ARR approach can include that it works with algebraic equations only. Moreover, the ARR approach can provide insights into the sensitivity of the residuals with respect to the system parameters in the frequency domain.

Exemplary Computer and Communication System

Figure 16:
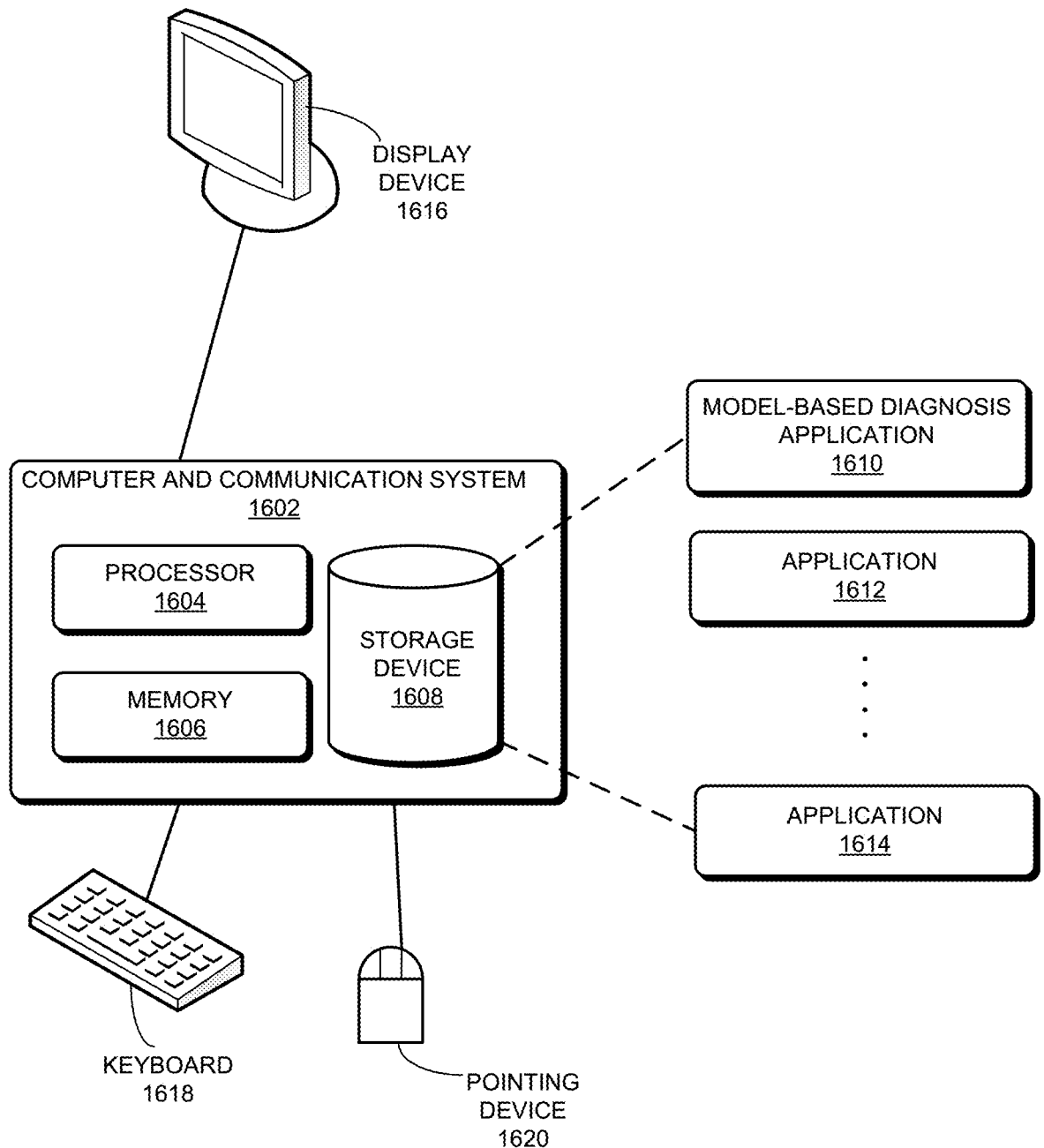
FIG. 16 illustrates an exemplary computer and communication system that facilitates model-based diagnosis in the frequency domain, in accordance with an embodiment of the present invention.

FIG. 16 illustrates an exemplary computer and communication system that facilitates model-based diagnosis in the frequency domain, in accordance with an embodiment of the present invention. A computer and communication system 1602 includes a processor 1604, a memory 1606, and a storage device 1608. Storage device 1608 stores a model-based diagnosis application 1610, as well as other applications, such as applications 1612 and 1614. During operation, model-based diagnosis application 1610 is loaded from storage device 1608 into memory 1606 and then executed by processor 1604. While executing the program, processor 1604 performs the aforementioned functions. Computer and communication system 1600 is coupled to an optional display 1616, keyboard 1618, and pointing device 1620.

In general, embodiments of the present invention provide a system and method for fault diagnosis in a complex physical system that can include multiple electrical, mechanical, and fluid components. It is assumed that a time-domain model of the physical system is available. By converting the time-domain model to a frequency-domain model and by performing the model parameter optimization in the frequency domain, embodiments of the present invention allow for parallelization of the computation, thus significantly increasing the computation efficiency. In some embodiments converting a time-domain model to the frequency domain may involve using FT to convert the time-domain model of the linear components to the frequency domain and using a machine-learning method (e.g., implementing a neural network) to learn the frequency domain behavior of the one or more non-linear components included in the system. Input and output signals of the system also need to be converted to the frequency domain in order to be used in the frequency-domain optimization. In some embodiments, DFT can be used to approximate CFT for converting the time-domain input and output signals to the frequency domain. A large enough time window and a sufficiently high sampling frequency can ensure a sufficiently close approximation. In this disclosure, three different optimization approaches (e.g., optimization-based, particle-filter-based, and ARR-based) were introduced to diagnose faults, more specifically, parametric faults. However, the scope of this disclosure is not limited by the actual optimization approach used as long as the optimization is performed in the frequency domain.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for diagnosing faults in a physical system, comprising:
obtaining a time-domain model of the physical system, wherein the time-domain model comprises a first set of equations associated with one or more time-domain model parameters having known values;
converting the time-domain model to frequency domain to obtain a frequency-domain model of the physical system, wherein the frequency-domain model comprises a second set of equations associated with a plurality of frequency-domain model parameters, wherein converting the time-domain model to the frequency-domain model comprises computing a first frequency-domain model parameter based on the one or more time-domain model parameters and determining a second frequency-domain model parameter based on a machine-learning model that is trained using training data generated based on the time-domain model;
obtaining time-domain input and output signals;
converting the time-domain input and output signals to frequency domain to obtain frequency-domain input and output signals;
identifying a frequency-domain model parameter having an expected value that is different from a known value based on the frequency-domain model and the frequency-domain input and output signals; and
generating a diagnostic output indicating a component within the physical system being faulty based on the identified frequency-domain model parameter.

2. The method of claim 1, wherein the time-domain model comprises at least one non-linear component.

3. The method of claim 1, wherein identifying the frequency-domain model parameter comprises one of:
applying an optimization algorithm;
applying a particle filter formulated in frequency domain; and
generating a fault signature matrix using analytical redundancy relations derived from the frequency-domain model.

4. The method of claim 1, wherein identifying the frequency-domain model parameter comprises:
selecting a set of frequencies; and
performing computation in parallel for each frequency within the selected set of frequencies, wherein output signals of the frequency-domain model at a respective frequency depend only on input signals at the respective frequency.

5. The method of claim 4, wherein selecting the set of frequencies comprises:
in response to magnitude of the frequency domain input or output signals at a particular frequency exceeding a predetermined threshold value, adding the particular frequency to the selected set of frequencies.

6. The method of claim 1, wherein identifying the frequency-domain model parameter comprises determining whether a difference between the expected value and the known value of the frequency-domain model parameter is greater than a predetermined threshold.

7. A non-transitory computer-readable storage medium storing instructions that when executed by a computer cause the computer to perform a method for diagnosing faults in a physical system, the method comprising:
obtaining a time-domain model of the physical system, wherein the time-domain model comprises a first set of equations associated with one or more time-domain model parameters having known values;
converting the time-domain model to a-frequency domain to obtain a frequency-domain model of the physical system, wherein the frequency-domain model comprises a second set of equations associated with a plurality of frequency-domain model parameters, wherein converting the time-domain model to the frequency-domain model comprises computing a first frequency-domain model parameter based on the one or more time-domain model parameters and determining a second frequency-domain model parameter based on a machine-learning model that is trained using training data generated based on the time-domain model;
obtaining time-domain input and output signals;
converting the time-domain input and output signals to the frequency domain to obtain frequency-domain input and output signals;

identifying a frequency-domain model parameter having an expected value that is different from a known value based on the frequency-domain model and the frequency-domain input and output signals; and generating a diagnostic output indicating a component within the physical system being faulty based on the identified frequency-domain model parameter.

8. The non-transitory computer-readable storage medium of claim 7, wherein the time-domain model comprises at least one non-linear component.

9. The non-transitory computer-readable storage medium of claim 7, wherein identifying the at least one model parameter comprises one of:

applying an optimization algorithm;

applying a particle filter formulated in the frequency domain; and generating a fault signature matrix using analytical redundancy relations derived from the frequency-domain model.

10. The non-transitory computer-readable storage medium of claim 7, wherein identifying the frequency-domain model parameter comprises:

selecting a set of frequencies; and performing computation in parallel for each frequency within the selected set of frequencies, wherein output signals of the frequency-domain model at a respective frequency depend only on input signals at the respective frequency.

11. The non-transitory computer-readable storage medium of claim 10, wherein selecting the set of frequencies comprises:

in response to magnitude of the frequency domain input or output signals at a particular frequency exceeding a predetermined threshold value, adding the particular frequency to the selected set of frequencies.

12. The non-transitory computer-readable storage medium of claim 7, wherein identifying the frequency-domain model parameter comprises determining whether a difference between the expected value and the known value of the at least one model parameter is greater than a predetermined threshold.

13. A fault-diagnosis system for diagnosing faults in a physical system, the system comprising:

a processor; and a storage device coupled to the processor and storing instructions, which when executed by the processor cause the processor to perform a method, the method comprising:

obtaining a time-domain model of the physical system, wherein the time-domain model comprises a first set of equations associated with one or more time-domain model parameters having known values;

converting the time-domain model to a-frequency domain to obtain a frequency-domain model of the physical system, wherein the frequency-domain model comprises a second set of equations associated with a plurality of frequency-domain model parameters, wherein converting the time-domain model to the frequency-domain model comprises computing a first frequency-domain model parameter based on the one or more time-domain model parameters and determining a second frequency-domain model parameter based on a machine-learning model that is trained using training data generated based on the time-domain model;

obtaining time-domain input and output signals;

converting the time-domain input and output signals to frequency domain to obtain frequency-domain input and output signals;

estimating expected values of the frequency-domain model parameters based on the frequency-domain model and the frequency-domain input and output signals;

identifying a frequency-domain model parameter having an expected value that is different from a known value; and generating a diagnostic output indicating a component within the physical system being faulty based on the identified frequency-domain model parameter.

14. The system of claim 13, wherein the time-domain model comprises at least one non-linear component.

15. The system of claim 13, wherein estimating the expected values of the parameters comprises:

applying an optimization algorithm;

applying a particle filter formulated in the frequency domain; or generating a fault signature matrix using analytical redundancy relations derived from the frequency-domain model.

16. The system of claim 13, wherein estimating the expected values of the parameters comprises:

selecting a set of frequencies; and performing computation in parallel for each frequency within the selected set of frequencies, wherein output signals of the frequency-domain model at a respective frequency depend only on input signals at the respective frequency.

17. The system of claim 16, wherein estimating the expected values of the parameters comprises:

in response to magnitude of the frequency domain input or output signals at a particular frequency exceeding a predetermined threshold value, adding the particular frequency to the selected set of frequencies.

* * * * *